United States Patent
Buchanan et al.

(10) Patent No.: US 6,584,446 B1
(45) Date of Patent: Jun. 24, 2003

(54) SYSTEM FOR UNDERWRITING A COMBINED JOINT LIFE AND LONG TERM CARE INSURANCE POLICY WHICH IS ACTUARIALLY RESPONSIVE TO LONG TERM CARE DEMANDS AND LIFE EXPECTANCIES OF THE INDIVIDUAL INSUREDS

(75) Inventors: William M. Buchanan, Stanley, KS (US); Jeffrey S. Drake, Overland Park, KS (US)

(73) Assignee: Golden Rule Insurance Company, Indianapolis, IN (US)

( * ) Notice: Subject to any disclaimer, the term of this patent is extended or adjusted under 35 U.S.C. 154(b) by 0 days.

(21) Appl. No.: 08/257,945

(22) Filed: Jun. 10, 1994

Related U.S. Application Data

(63) Continuation of application No. 07/479,872, filed on Feb. 14, 1990, now abandoned.

(51) Int. Cl.[7] .............................................. G06F 17/60
(52) U.S. Cl. ............................................................ 705/4
(58) Field of Search ................................. 364/401, 406, 364/413.01, 408; 705/4

(56) References Cited

U.S. PATENT DOCUMENTS 4,346,442 A   8/1982   Musmanno ................. 364/408

(List continued on next page.)

FOREIGN PATENT DOCUMENTS

| JP | 10049589 | * | 2/1998 |
| JP | 10228509 | * | 8/1998 |
| JP | 2002222311 | * | 8/2002 |
| WO | WO 200063813 | * | 10/2000 |

OTHER PUBLICATIONS

Burgess; The Electronic Experts; Washington Post; 10489,; H1, H4.*

*Society of Actuaries' Textbook on Life Contingencies*, Chapter 9, "The Joint–Life Status," notes Section 5, "The law of uniform seniority."

*Financial Condition Examiners Handbook*, "1980 CSO Mortality Table." Printing date: 11/95, adopted by the NAIC in Dec. '86.

*Primary Examiner*—Mark H. Rinehart
*Assistant Examiner*—X. Chung-Trans
(74) *Attorney, Agent, or Firm*—Woodard, Emhardt, Moriarty, McNett & Henry LLP

(57) ABSTRACT

Sets of future risk expectation strings for long term care and for life expectancy are categorized into a plurality of Joint Equal Age Risk Classifications, upon which risk exposure sequencing and present risk value analysis are applied to calculate joint equal age present risk values that are inputted into a Joint Equal Age Risk Chart; future risk expectation strings for long term care and for life expectancy are also categorized into a plurality of Age Differential Classifications, which are distinct and independent from the separately categorized Joint Equal Age Classifications. Risk exposure sequencing and present risk value analysis are applied to calculate temporary joint equal age present risk values and temporary differential present risk values, which are compared to generate temporary age equivalence differentials that are inputted into a temporary age equivalence matrix from which an age differential adjustment factors are drawn and inputted into an Age Differential Adjustment Chart. The so constructed Joint Equal Age and Age Differential Adjustment Charts are then used, in combination, to form the basis for rate structuring of an insurance product covering joint long term care and life benefits.

18 Claims, 9 Drawing Sheets

U.S. PATENT DOCUMENTS

| | | |
|---|---|---|
| 4,376,978 A | 3/1983 | Musmanno ................. 364/408 |
| 4,597,046 A | 6/1986 | Musmanno et al. ........ 364/408 |
| 4,642,768 A | 2/1987 | Roberts ...................... 364/408 |
| 4,700,297 A | 10/1987 | Hagel, Sr. et al. .......... 364/408 |
| 4,722,055 A | 1/1988 | Roberts ...................... 364/408 |
| 4,752,877 A | 6/1988 | Roberts et al. ............. 364/408 |
| 4,774,663 A | 9/1988 | Musmanno et al. ........ 364/408 |
| 4,831,526 A * | 5/1989 | Luchs ......................... 364/401 |
| 4,839,804 A | 6/1989 | Roberts et al. ............. 364/408 |
| 4,975,840 A * | 12/1990 | DeTore et al. .............. 364/401 |
| 5,025,138 A | 6/1991 | Cuervo ....................... 235/379 |
| 5,752,236 A * | 5/1998 | Sexton et al. ................. 705/4 |
| 2002/0103679 A1 * | 8/2002 | Burkhalter et al. ............ 705/4 |

* cited by examiner

JOINT EQUAL AGE RISK CHART

| ISSUE AGE | JEA CLASS I | JEA CLASS II | JEA CLASS III | JEA CLASS IV |
|---|---|---|---|---|
| 30 | 19.34 | 21.08 | 24.32 | 29.31 |
| 31 | 20.84 | 22.72 | 26.22 | 31.60 |
| 32 | 22.47 | 24.49 | 28.28 | 34.08 |
| 33 | 24.22 | 26.40 | 30.50 | 36.75 |
| 34 | 26.11 | 28.46 | 32.89 | 39.63 |
| 35 | 28.15 | 30.67 | 35.47 | 42.72 |
| 36 | 30.35 | 33.06 | 38.24 | 46.05 |
| 37 | 32.72 | 35.63 | 41.23 | 49.63 |
| 38 | 35.27 | 38.40 | 44.46 | 53.48 |
| 39 | 38.02 | 41.38 | 47.92 | 57.60 |
| 40 | 40.98 | 44.58 | 51.64 | 62.01 |
| 41 | 44.16 | 48.00 | 55.63 | 66.72 |
| 42 | 47.56 | 51.66 | 59.90 | 71.75 |
| 43 | 51.21 | 55.58 | 64.47 | 77.10 |
| 44 | 55.13 | 59.77 | 69.35 | 82.79 |
| 45 | 59.32 | 64.25 | 74.57 | 88.85 |
| 46 | 63.81 | 69.04 | 80.14 | 95.28 |
| 47 | 68.63 | 74.17 | 86.10 | 102.12 |
| 48 | 73.80 | 79.66 | 92.47 | 109.39 |
| 49 | 79.35 | 85.53 | 99.28 | 117.11 |
| 50 | 85.31 | 91.82 | 106.55 | 125.30 |
| 51 | 91.70 | 98.55 | 114.31 | 133.99 |
| 52 | 98.56 | 105.75 | 122.59 | 143.19 |
| 53 | 105.93 | 113.45 | 131.40 | 152.90 |
| 54 | 113.82 | 121.67 | 140.78 | 163.15 |
| 55 | 122.27 | 130.46 | 150.74 | 173.94 |
| 56 | 131.32 | 139.82 | 161.30 | 185.28 |
| 57 | 140.98 | 149.80 | 172.48 | 197.19 |
| 58 | 151.30 | 160.42 | 184.29 | 209.68 |
| 59 | 162.30 | 171.71 | 196.76 | 222.75 |
| 60 | 174.01 | 183.71 | 209.89 | 236.43 |
| 61 | 186.46 | 196.43 | 223.70 | 250.70 |
| 62 | 199.67 | 209.89 | 238.18 | 265.55 |
| 63 | 213.65 | 224.09 | 253.34 | 280.96 |
| 64 | 228.42 | 239.03 | 269.15 | 296.88 |
| 65 | 243.95 | 254.69 | 285.59 | 313.29 |
| 66 | 260.25 | 271.07 | 302.64 | 330.17 |
| 67 | 277.35 | 288.19 | 320.30 | 347.53 |
| 68 | 295.25 | 306.07 | 338.57 | 365.37 |
| 69 | 313.94 | 324.71 | 357.43 | 383.68 |
| 70 | 333.40 | 344.09 | 376.83 | 402.43 |

Fig. 5

LONG TERM CARE AGE DIFFERENTIAL ADJUSTMENT CHART

| AGE DIFFERENTIAL | MALE/FEMALE | MALE/FEMALE (MALE OLDER) | MALE/FEMALE (FEMALE OLDER) | FEMALE/FEMALE |
|---|---|---|---|---|
| 0 | -2 | -1 | -1 | -1 |
| 1 | -2 | -1 | -1 | -1 |
| 2 | -1 | 0 | -1 | 0 |
| 3 | -1 | 0 | 0 | 1 |
| 4 | 0 | 1 | 0 | 1 |
| 5 | 0 | 1 | 1 | 2 |
| 6 | 1 | 2 | 1 | 2 |
| 7 | 1 | 3 | 2 | 3 |
| 8 | 2 | 3 | 2 | 3 |
| 9 | 2 | 4 | 3 | 4 |
| 10 | 3 | 4 | 3 | 4 |
| 11 | 4 | 5 | 4 | 5 |
| 12 | 4 | 6 | 4 | 5 |
| 13 | 5 | 6 | 5 | 6 |
| 14 | 5 | 7 | 5 | 6 |
| 15 | 5 | 7 | 5 | 6 |
| 16 | 5 | 7 | 5 | 6 |
| 17 | 5 | 7 | 5 | 6 |
| 18 | 5 | 7 | 5 | 6 |
| 19 | 5 | 7 | 5 | 6 |
| 20 | 5 | 7 | 5 | 6 |
| 21 | 5 | 7 | 5 | 6 |
| 22 | 5 | 7 | 5 | 6 |
| 23 | 5 | 7 | 5 | 6 |
| 24 | 5 | 7 | 5 | 6 |
| 25 | 5 | 7 | 5 | 6 |
| 26 | 5 | 7 | 5 | 6 |
| 27 | 5 | 7 | 5 | 6 |
| 28 | 5 | 7 | 5 | 6 |
| 29 | 5 | 7 | 5 | 6 |
| 30 | 5 | 7 | 5 | 6 |

Fig. 6

INDIVIDUAL RISK EXPECTATION STRINGS

MALE, SMOKER AGE 35

| AGE | FOR L.T.C. | FOR LIFE | AGE | FOR L.T.C. | FOR LIFE |
|---|---|---|---|---|---|
| 35 | 0.49000 | 2.72000 | 71 | 16.75000 | 61.63000 |
| 36 | 0.52000 | 2.92000 | 72 | 19.60000 | 67.18000 |
| 37 | 0.55000 | 3.17000 | 73 | 23.00000 | 73.33000 |
| 38 | 0.59000 | 3.45000 | 74 | 27.05000 | 80.07000 |
| 39 | 0.64000 | 3.77000 | 75 | 31.85000 | 87.27000 |
| 40 | 0.70000 | 4.14000 | 76 | 37.50000 | 94.63000 |
| 41 | 0.77000 | 4.54000 | 77 | 44.05000 | 102.02000 |
| 42 | 0.85000 | 4.98000 | 78 | 51.50000 | 109.49000 |
| 43 | 0.94000 | 5.46000 | 79 | 59.80000 | 117.30000 |
| 44 | 1.03000 | 5.99000 | 80 | 68.90000 | 125.71000 |
| 45 | 1.12000 | 6.55000 | 81 | 78.73000 | 134.96000 |
| 46 | 1.21000 | 7.13000 | 82 | 89.25000 | 145.21000 |
| 47 | 1.30000 | 7.76000 | 83 | 100.25000 | 156.29000 |
| 48 | 1.39000 | 8.44000 | 84 | 111.55000 | 167.83000 |
| 49 | 1.48000 | 9.18000 | 85 | 122.90000 | 179.44000 |
| 50 | 1.57000 | 10.00000 | 86 | 134.05000 | 190.84000 |
| 51 | 1.66000 | 10.93000 | 87 | 144.75000 | 202.54000 |
| 52 | 1.75000 | 11.98000 | 88 | 154.85000 | 214.73000 |
| 53 | 1.85000 | 13.17000 | 89 | 164.35000 | 226.85000 |
| 54 | 1.97000 | 14.47000 | 90 | 173.40000 | 239.08000 |
| 55 | 2.12000 | 15.86000 | 91 | 182.20000 | 251.80000 |
| 56 | 2.31000 | 17.33000 | 92 | 190.90000 | 266.55000 |
| 57 | 2.55000 | 18.88000 | 93 | 199.50000 | 285.47000 |
| 58 | 2.84000 | 20.51000 | 94 | 208.00000 | 311.27000 |
| 59 | 3.18000 | 22.26000 | 95 | 216.40000 | 351.06000 |
| 60 | 3.57000 | 24.21000 | 96 | 224.70000 | 420.99000 |
| 61 | 4.01000 | 26.41000 | 97 | 232.90000 | 541.00000 |
| 62 | 4.50000 | 28.89000 | 98 | 241.00000 | 745.15000 |
| 63 | 5.10000 | 31.66000 | 99 | 0.00000 | 1000.00000 |
| 64 | 5.85000 | 34.69000 | | | |
| 65 | 6.75000 | 37.90000 | | | |
| 66 | 7.80000 | 41.26000 | | | |
| 67 | 9.05000 | 44.74000 | | | |
| 68 | 10.55000 | 48.39000 | | | |
| 69 | 12.30000 | 52.35000 | | | |
| 70 | 14.35000 | 56.72000 | | | |

Fig. 7A

INDIVIDUAL RISK EXPECTATION STRINGS

FEMALE, NON-SMOKER AGE 50

| AGE | FOR L.T.C. | FOR LIFE | AGE | FOR L.T.C. | FOR LIFE |
|---|---|---|---|---|---|
| 50 | 4.98000 | 4.34000 | 80 | 74.79000 | 68.81000 |
| 51 | 5.40000 | 4.67000 | 81 | 75.88000 | 77.01000 |
| 52 | 5.89000 | 5.05000 | 82 | 76.40000 | 86.46000 |
| 53 | 6.44000 | 5.47000 | 83 | 76.27000 | 97.12000 |
| 54 | 7.09000 | 5.90000 | 84 | 75.43000 | 108.87000 |
| 55 | 7.85000 | 6.36000 | 85 | 73.81000 | 121.58000 |
| 56 | 8.76000 | 6.82000 | 86 | 71.36000 | 135.16000 |
| 57 | 9.85000 | 7.27000 | 87 | 68.00000 | 149.59000 |
| 58 | 11.16000 | 7.72000 | 88 | 63.67000 | 164.87999 |
| 59 | 12.71000 | 8.23000 | 89 | 58.30000 | 181.15000 |
| 60 | 14.51000 | 8.83000 | 90 | 51.83000 | 198.53000 |
| 61 | 16.58000 | 9.57000 | 91 | 44.21000 | 217.42000 |
| 62 | 18.92000 | 10.49000 | 92 | 35.39000 | 238.53000 |
| 63 | 21.51000 | 11.62000 | 93 | 25.30000 | 263.35001 |
| 64 | 24.35000 | 12.89000 | 94 | 13.91000 | 295.23000 |
| 65 | 27.41000 | 14.26000 | 95 | 0.00000 | 341.01999 |
| 66 | 30.67000 | 15.68000 | 96 | 0.00000 | 413.87999 |
| 67 | 34.09000 | 17.13000 | 97 | 0.00000 | 537.24003 |
| 68 | 37.64000 | 18.63000 | 98 | 0.00000 | 743.96002 |
| 69 | 41.29000 | 20.30000 | 99 | 0.00000 | 1000.00000 |
| 70 | 44.99000 | 22.26000 | | | |
| 71 | 48.71000 | 24.65000 | | | |
| 72 | 52.39000 | 27.58000 | | | |
| 73 | 55.99000 | 31.09000 | | | |
| 74 | 59.46000 | 35.13000 | | | |
| 75 | 62.76000 | 39.64000 | | | |
| 76 | 65.84000 | 44.52000 | | | |
| 77 | 68.44000 | 49.75000 | | | |
| 78 | 71.11000 | 55.41000 | | | |
| 79 | 73.17000 | 61.68000 | | | |

SYSTEM FOR UNDERWRITING A COMBINED JOINT LIFE AND LONG TERM CARE INSURANCE POLICY WHICH IS ACTUARIALLY RESPONSIVE TO LONG TERM CARE DEMANDS AND LIFE EXPECTANCIES OF THE INDIVIDUAL INSUREDS

This application is a continuation, of application Ser. No. 07/479,872, filed Feb. 14, 1990, now abandoned.

Over the course of time, insurance has played a significant role in protecting the valued aspects of our lives. When insured against loss, we have found ourselves in an enclave of safety, guarded against, if not the loss itself, then at least the risk of loss. When not insured, we have left ourselves exposed to the unpredictable nature of fate.

Dating as far back as ancient times, insurance has protected us from virtually all varieties of loss. We have been protected against the loss of life, property, and the ability to perform required tasks. Our health and medical care requirements have been insured, as well as our retirement needs. Today, we find that nearly each aspect of our life is protectible through insurance.

The growth of the insurance industry in our society has been built upon the foundation of actuarial science, which relates the actuality of the risk of loss of the matter being insured to the premium to be paid. By identifying the value of the risk, actuarial science ensures that the insured gets the insurance value of what he pays for. Without this science, then insurance would be reduced to no more than a scheme of blind gambles with unrelated payoffs.

In present society, there has been a clearly developed need to provide for the long term care requirements of the elderly. With improved medical care, people are living longer. Yet, attention and care must be given to the aged who are no longer able to perform all the tasks of daily living. It is anticipated that nearly half of all people presently aged 65 and older will need care in a nursing home at some time in their lives. Long term care policies, in various forms, have been written to account for these needs.

Another general insurance interest has long been that of life insurance protection, which accommodates the financial needs of others upon the death of the insured. A virtually endless variety of life insurance policies have been written. These policies have included the joint life, last to die policy, which pays a benefit upon the second death of two insureds, usually a husband and wife.

The vehicle of the joint life policy has been used to accommodate estate planning requirements of the insureds upon the death of the second insured. By allowing for the pre-payment of death benefits, these policies are potentially used to provide for long term care requirements of elderly couples. No policy, however, has heretofore been provided which has combined specified long term care benefits with a joint and last survivor life insurance product, and particularly wherein the specified benefits are actuarially responsive to the insureds' actual long term care requirements as well as their life expectancies.

There is a need for an insurance product which provides for dual long term care requirements, with joint life benefits upon the death of the survivor, which is actuarially responsive to the particularized long term health care expectations of dually insured parties as well as their life expectancies. A new and unique means at arriving at such a product is provided for herein.

SUMMARY OF THE INVENTION

Generally speaking, the present invention provides a new and unique system for underwriting a combined, joint life and long term care insurance policy which is actuarially responsive to the long term care expectations as well as the life expectancies of the individuals being insured. A comprehensive understanding of the full significance and scope of this invention can be drawn from the following specification and claims.

BRIEF DESCRIPTION OF THE DRAWINGS

FIG. 5 is a table illustrating a sample Joint Equal Age Risk chart that has been generated by the Joint Equal Age Risk Charting Methodology of FIG. 3, valued in dollars per $1,000 of benefit offering, and where a discount rate of 9% has been applied.

FIG. 6 is a table illustrating a sample Age Differential Adjustment Chart that has been generated by the application of the Age Differential Adjustment Methodology of FIG. 3.

FIG. 7A is a table showing individual risk expectation strings for a 35 year old male smoker.

FIG. 7B is a table showing individual risk expectation strings for a 50 year old female non-smoker.

DESCRIPTION OF THE PREFERRED EMBODIMENT

Figure 1:
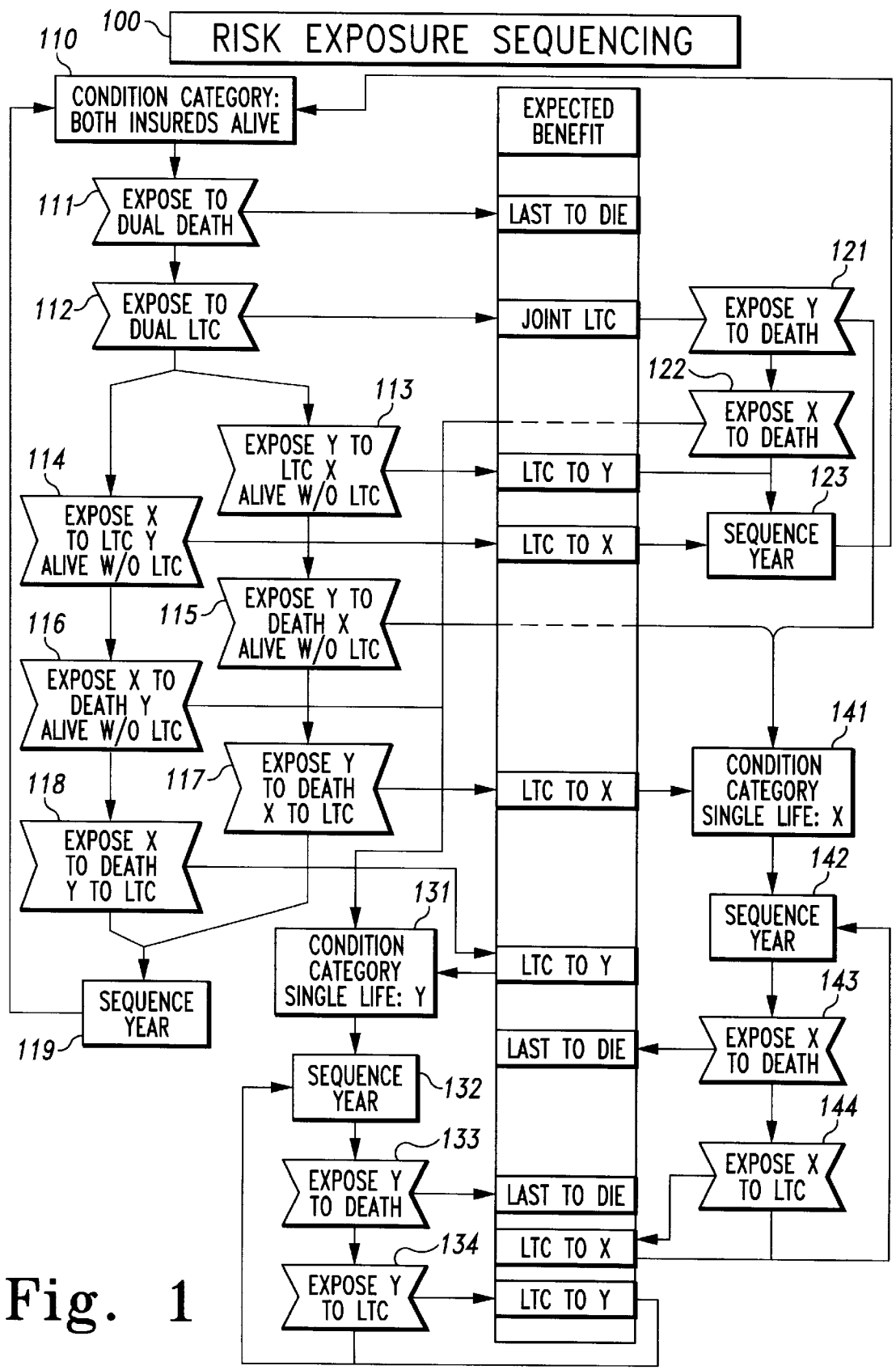
FIG. 1 is Risk Exposure Sequencing flowchart, illustrating the systemology by which expected benefits are calculated for any given combination of insureds.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Actuarially, each single insured may be viewed as a series of future annual expectations of benefit payment. Thus, for a single premium, single life, insurance policy, a typical actuarial analysis might look to the sum of this future expectation string to form a rate basis for that insured. Since the expectation string of a particular insured will vary depending upon age, sex, and smoker status, an independent analysis can be conducted for each such possible categorization to yield a rate chart. Thus, for example, a rate chart for a single premium, single life, insurance policy, for insureds between 30 and 70, might include a table of 120 separately defined rates, one for each possible variant combination of age, sex, and smoking status. Such a rate chart is easily manageable as a basis for making a policy offering.

The above type of analysis, however, does not lend itself to the complexities of multiple life policies, and particularly fails where, as in the present case, a policy is to be combined with both joint life and joint long term care protection, and where such a policy is to be truly actuarially responsive to actually expected long term care demands, as well as to the life expectancies of the insureds. To give some appreciation to the significance of the problem at hand, consider the fact that, for such a policy, there would be multiple independencies, not only for age, sex, and smoking classification, but also for the independent future benefit expectation strings for life expectancy and for long term care. The matrix needed to contain the full charting of all such possible independent combinations, over a range of just 40 years, would require in excess of $2 \times 10^8$ cell locations. The impracticality of such a rate structuring should be evident.

A new and unique system for underwriting such a combined, joint life and long term care insurance policy which is actuarially responsive to long term care demands, and which forms the basis for the present application, will now be taught. As described herein, the present invention is utilized to form the basis for calculating the expected value of the long term care claims for either insured and the last to die death benefits of the surviving insured on an insurance contract, with two insured lives and where specific limits on total benefits are to be applied. In the course of the following description, reference shall be made to FIGS. 1–6, which illustrate a flow charting of the disclosed underwriting system, and may therefore enhance the understanding of the invention being disclosed.

In constructing the risk charting which is to form the basis of policy offering, lives in different categories are exposed to the probability of long term care and/or last to die death benefit. The long term care claim payments may be paid to either insured at any time or both at the same time. In this sense, this applied exposure is very different from a traditional last to die death benefit because it can be paid to both insureds at the same time, and where each insured is experiencing an independent risk of exposure.

Secondly, the last to die death benefit is, as its name implies, an insurance contract which pays a death benefit upon the death of the second of two insureds to die. The amount of the death benefit which would be paid is dependent upon the amount of benefit which has not already been paid because of prior long term care claims. It is possible that upon the death of the second to die, there is actually no death claim paid as all benefits had been paid through the long term care portion of the policy. Therefore, it is possible to pay a last to die death benefit in the range of 100% to 0% of the initial benefit because of prior long term care benefit payments.

In accordance to the flow charting shown in FIG. 1, a Risk Exposure Sequencing 100 routine calculates the expected benefits for any given combination of insureds (X and Y) When the policy is issued, there are two insureds alive, each having their own particular string of future risk expectations for 1) long term care $P_{LTC}[P_1, P_2, P_3. \ldots]$ and 2) life expectancy $P_{LE}[P_1, P_2, P_3. \ldots]$, which are dependent upon age, sex, and smoking classification parameters. From this point, risk sequencing is initiated.

Thus, Risk Exposure Sequencing 100 is initialized at Condition Category: Both Insureds Alive 110. From this point, the policy is exposed to the probability that both insureds will die during the present year (Expose to Dual Death 111). Based upon the probability expectation of this occurrence, an entry is made into Expected Benefit Register 199. The remaining probability of non-occurrence then flows through to the next occurrence exposure test in which the insured are exposed to the probability that both will undergo long term care claims during the year (Expose to Dual LTC 112). The probability of such an occurrence produces an entry into Expected Benefit Register 199. Continuing, the remaining probability of non-occurrence then flows through to the subsequent occurrence exposure tests: Expose Y to LTC, X Alive without LTC 113, X to LTC, Y Alive without LTC 114, Expose Y to Death, X Alive without LTC 115, Expose X to Death, Y Alive without LTC 116, Expose Y to Death, X to LTC 117, and Expose X to Death, Y to LTC 118. For each such exposure test, the probability of a positive such occurrence upon which a claim would be based, will activate an entry of the probability of the occurrence into Expected Benefit Register 199. Non-occurrence sequences the remaining probability to subsequent risk occurrence tests, with the remaining probability of non-occurrence of all such events being sequenced to the subsequent year (Sequence Year 119).

Some positive risk exposures, in addition to triggering an expected benefit entry into Expected Benefit Register 199, may also trigger subsequent risk exposures and/or a change in the conditions under which risk sequencing is to be applied. For instance, the positive risk of dual long term care benefits (Box 112) is also applied against the probability that either Y would die in the same year (Expose Y to Death 121) or that X would die in the same year (Expose X to death 122). The negative flow through probability after exposures 121 and 122 may then be sequenced to the subsequent year (Sequence Year 123). The positive risk exposure at Expose Y to Death 121, on the other hand, causes a change in the condition of risk sequencing to Condition Category, Single Life Y 131, prior to sequencing to the subsequent year (Sequence Year 132). The positive probability resulting from these events may then be sequenced through a single life probability routine whereby Y is exposed to death (Box 133) and long term care (Box 134), prior to subsequent annual sequencing (Box 132).

In the same way, the positive risk exposure at Expose X to Death 121 causes a change in condition for subsequent risk sequencing to Condition Category, Single Life X 141, prior to sequencing to the subsequent year (Sequence Year 142). The positive probability resulting from this event may then be sequenced through a single life probability routine whereby X is exposed to death (Box 143) and long term care (Box 144), prior to subsequent annual sequencing (Box 142).

It should be understood that, for a given combination of insureds, having a given set of individual expectation strings, Risk Exposure Sequencing 100 is applied to all possible probabilities. For each exposure step, the positive probability of the occurrence flows through to subsequent steps resulting that positive occurrence, and the negative probability of the non-occurrence flows through to the steps resulting from the negative occurrence. In this way, all possible probability results are accounted for to result in the Expected Benefit Register holding the information of the probabilities of all possibly expected claims against the policy.

Figure 2:
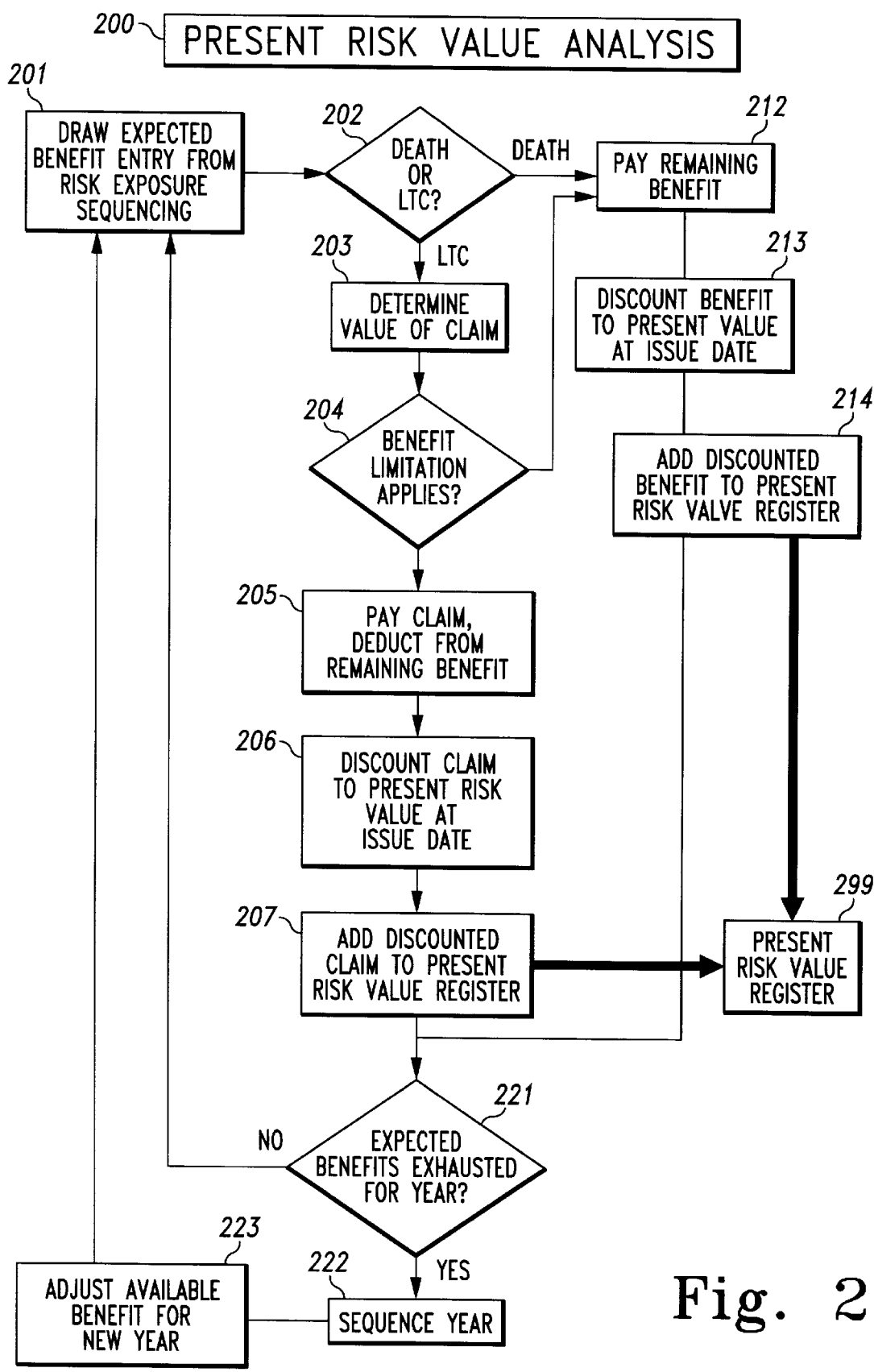
FIG. 2 is a chart illustrating the Present Risk Value Analysis that is applied to a set of expected benefit entries generated by the operation of Risk Exposure Sequencing of FIG. 1.

Referring now to FIG. 2, Present Risk Value Analysis 200 operates upon a set of expected benefit entries generated by the operation of Risk Exposure Sequencing 100 routine of FIG. 1 for a given pair of insureds. By the operation of Present Risk Value Analysis 200, a Present Risk Value may be generated at Present Risk Value Register 299 for any particular combination of insureds. Describing this routine, each expected benefit entry for a given risk exposure sequence application, is operated upon in the following manner: First, an expected benefit entry is drawn (Box 201), and categorized by whether it specifies a death benefit or an LTC claim (Box 202). If an LTC benefit is to be paid, the value of the claim is determined (Box 203), and compared against the benefit limitations of the policy (Box 204). If the benefit limitations do not apply, then the claim is paid and deducted from the remaining benefit available (Box 205), and the claim is then discounted to its present risk value at the issue date of the policy (Box 206). The discounted claim is then added (Box 207) to the Present Risk Value Register 299, by which the overall risk value of the policy to be offered is tabulated for the insured combination being analyzed. Where the expected benefit entry, on the other hand, is a death benefit, then the remaining benefit is paid (Box 212), and discounted to its present value at issue date (Box 213). The discounted benefit is then added (Box 214) to the Present Risk Value Register 299.

After a particular expected benefit entry has been operated upon to generate an entry into Present Risk Value Register 299, (through either steps 202–207, or 212–214), then the process is stepped to the next expected benefit entry to be processed (Box 221). If expected benefits generated for a given year by Risk Exposure Sequencing 100 have not been exhausted, then the next such expected benefit entry is drawn (Box 201), and the same set of operations are applied to this subsequent benefit entry. If all expected benefit entries have been exhausted for a given year, then the year is sequenced (Box 222), the available benefits are adjusted to account for the passage of the year (Box 223), and the described operations are then applied to the expected benefit entries for that subsequent year (Boxes 201 et seq.).

In combination, the above described Risk Exposure Sequencing 100 and Present Risk Value Analysis 200 routines generate a present risk value for any particular combination of insureds. When considering the massive amounts of data upon which these routines are operable, and the extent of sequencing necessary to create just one such present risk value, one can readily appreciate that an actuarially responsive insurance product could not be feasibly founded upon the simple application of these routines alone. The methodology into which these routines have been incorporated into the underwriting system of the present invention to produce a feasible insurance product that is actuarially responsive to long term care and life expectancy demands will now be described.

Figure 3:
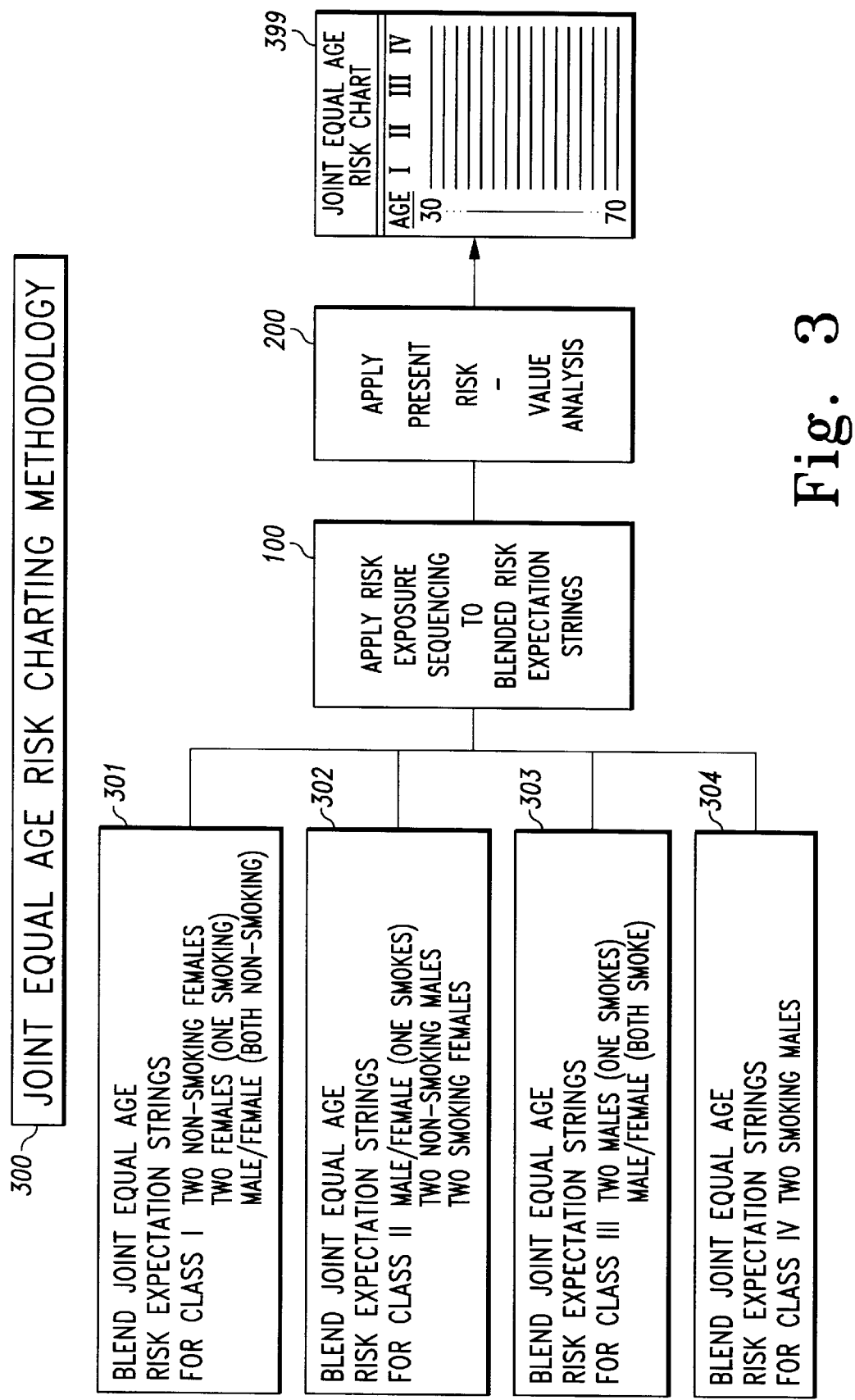
FIG. 3 shows the Joint Equal Age Risk Charting Methodology by which expectation strings for various types of insureds are blended into a Joint Equal Age Risk Chart.

FIG. 3 shows the Joint Equal Age Risk Charting Methodology 300 by which expectation strings for various types of insureds are blended into a Joint Equal Age Risk Chart 399. In this process, all risk expectation strings are first blended into one of four Joint Equal Age Risk Classifications: Class I, which includes two non-smoking females, two females (one smoking), and a male and female (both non-smoking) (Box 301); Class II, which includes a male and female (one smoking), two non-smoking males, and two smoking females (Box 302); Class III, which includes two males (one smokes), and a male and female (both smokes) (Box 303), and Class IV, which includes two smoking males (Box 304).

By this blending process, the risk expectation strings for individual subcategories within a given Joint Equal Age Classification are averaged to yield a set of blended risk expectation strings for that Classification. The blended risk expectation strings are then operated upon by Risk Exposure Sequencing 100 and Present Risk Value Analysis 200 to generate Joint Equal Age Risk Chart 399. As an alternative method of approximation, Risk Exposure Sequencing 100 and Present Risk Value Analysis 200 could be applied to unblended risk expectation strings of joint equal age, with the resultant set of present risk values being blended, or averaged, to generate a joint equal age present risk value for that given Classification and issue age.

Figure 4A:
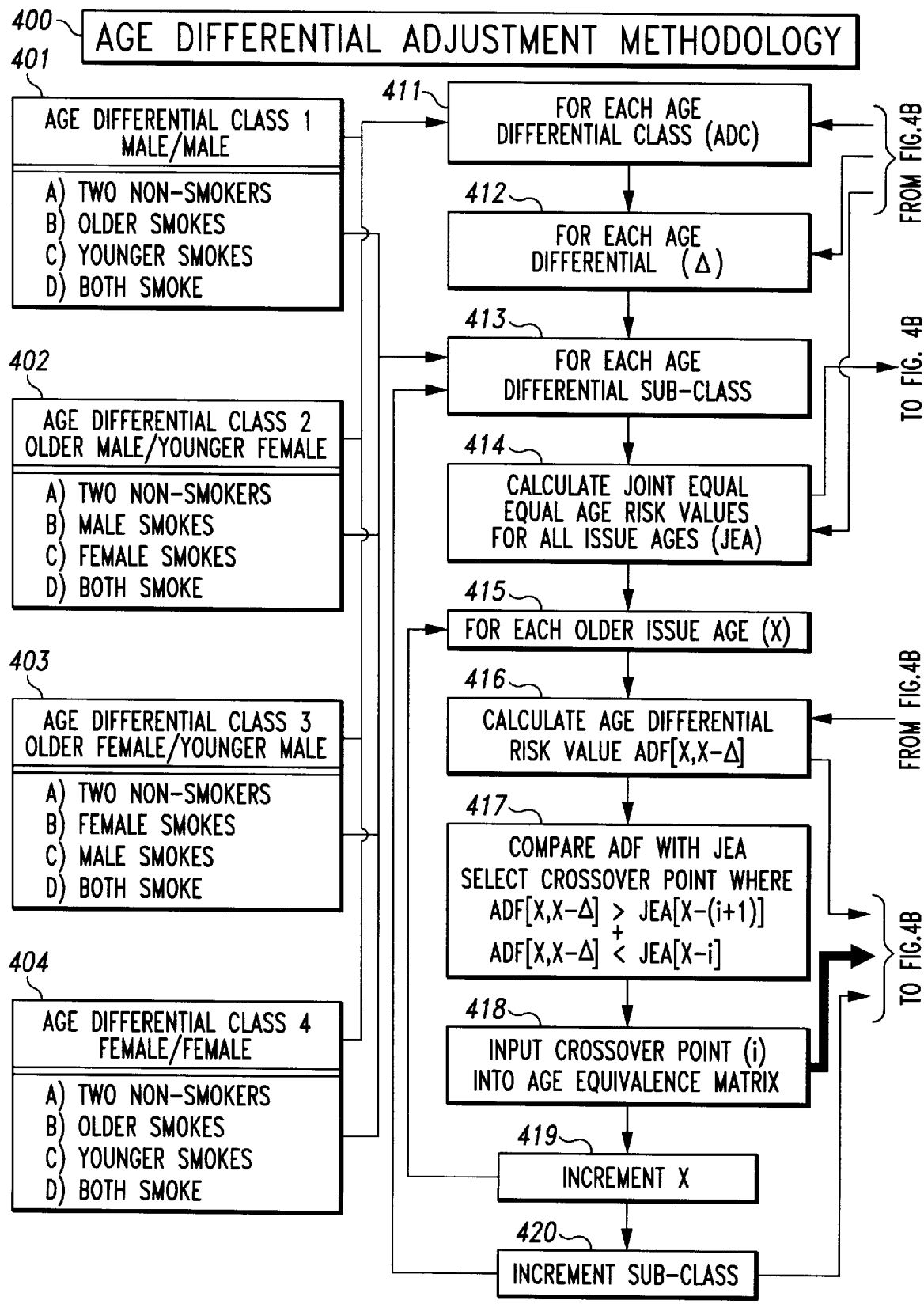
FIG. 4 flowcharts the Age Differential Adjustment Methodology by which age differential combinations are factored into the rate construction.
Figure 4B:
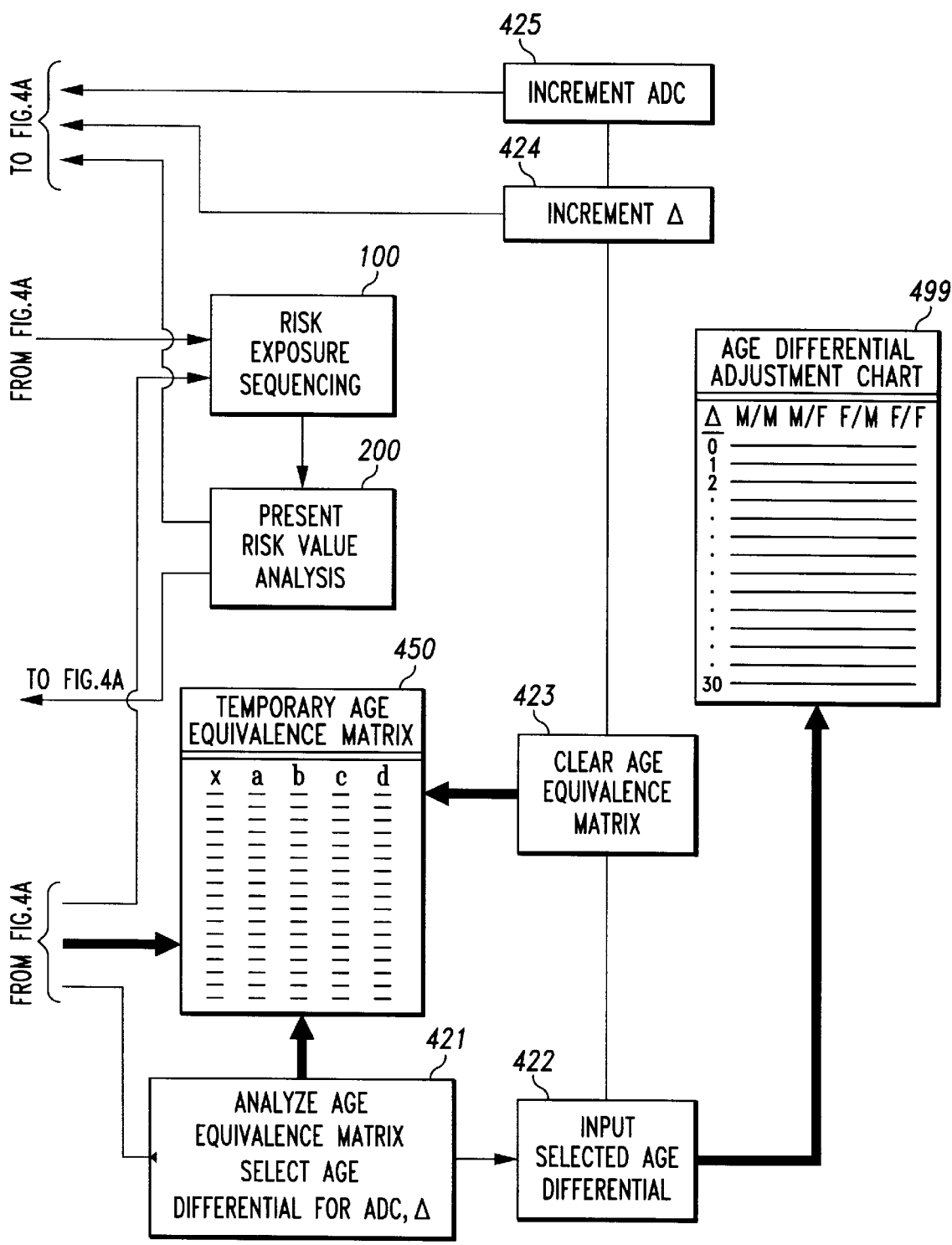

FIG. 4 flowcharts the Age Differential Adjustment Methodology 400 by which age differential combinations are factored into the rate construction. As shown in FIG. 4, four distinctly separate classification structures are created for the construction of Age Differential Chart 499: Age Differential Class 1 (Box 401), where the insureds are two males; Age Differential Class 2 (Box 402), where the insureds are a male/female combination with the older insured being the male; Age Differential Class 3 (Box 403), where the insureds are a male/female combination with the older insured being the female; and Age Differential Class 4 (Box 404), where the insureds are two females.

The following steps are then performed to operate upon the four Age Differential Classes (ADC) to construct an Age Differential Adjustment Chart 499 which forms the basis for modification of rates based upon Joint Equal Age Chart 399 to account for the situation where the two insured are not of the same age. The steps involve several reiterative loop sequences:

The first and second primary loops are 1) for each age differential class (ADC) (Box 411) and for each age differential ($\Delta$) (Box 412). For each combination of ADC and $\Delta$, the following steps are performed:

As a tertiary loop, operative steps are performed for each age differential subclass (Box 413): Joint equal age present risk values (JEA) are calculated for all issue ages (Box 414), accessing both Risk Exposure Sequencing 100 and Present Risk Value Analysis 200 in the process. Then, Risk Exposure Sequencing 100 and Present Risk Value Analysis 200 are also accessed to calculate (Box 416) age differential present risk values (ADF[x,x–$\Delta$]) for each older issue age (x).

The calculated age differential present risk value (ADF [x,x–$\Delta$]) is then compared with the joint equal age present risk values for the same ADC, $\Delta$, ADC sub-class, and the crossover point is selected where where ADF [x,x–$\Delta$]<JEA [(i–1)] and ADF[x,x–$\Delta$]>JEA[i] (Box 417). The determined crossover point differential (x–i) is then inputted (Box 418) into a Temporary Age Equivalence Matrix (Box 450). To complete the Temporary Age Equivalence Matrix (Box 450), the age differential present risk value calculation and ADF-JEA comparison and inputting of crossover point (Boxes 415–418) are reiterated for all issue ages (x) (Box 419); and the entire step comparison process (Boxes 413–420), is reiterated for all age differential subclasses within a given ADC and $\Delta$ (Box 420).

Once the Temporary Age Equivalence Matrix 450 is completed, the completed Temporary Age Equivalence Matrix 450 for a given ADC and $\Delta$ is analyzed to select an age differential adjustment factor for said ADC and $\Delta$ (Box 421), and the selected age differential adjustment factor is inputted (Box 422) into Age Differential Adjustment Chart. 499. Age differential adjustment factor selection may be suitably based upon a dermination of the mean, median, mode, minimum or maximum functions of the data that composes Temporary Age Equivalence Matrix 450. In the example given, the minimum function has been used to approximate an appropriate age differential adjustment.

Once the age differential factor for a particular ADC and $\Delta$ has been inputted, then the Temprorary Age Equivalence Matrix is cleared (Box 423), and $\Delta$ is incremented (Box 424) to the next age differential for reiteration of steps 412–423. When age differential factors have been calculated and inputted into Age Differential Adjustment Chart 499 for all age differentials $\Delta$ within an Age Differential Class ADC, then the ADC is incremented (Box 425) to the next ADC for reiteration of the complete process of steps 411–425. In this way, a complete Age Differential Adjustment Chart 499 is generated. Joint Equal Age Chart 399 and Age Differential Adjustment Chart 499 are then used, in combination, to form the basis for rate structuring of an insurance product covering joint long term care and life benefits.

The combined use of Joint Equal Age Chart 399 and Age Differential Adjustment Chart 499 for rate structuring should be readily apparent. For any two insureds (X,Y), each would be categorized by age, sex, and smoking status (i.e. X: 60 years old, male, smoker; Y: 54 years old, female, smoker). By their combined Joint Equal Age Risk Classification status (Classification III, male/female (both smoke)), a Joint Equal Age Present Risk Value may be drawn from Joint Equal Age Chart 399 for the age category of the older of the two insured (age: 60; JEA: xxx). An adjustment is then made to account for the age differential of the two insured which is based upon the a separately and independently defined Age Differential Classification (ADC 2: male/female, male older; age differential $\Delta=6$; age differential adjustment factor=2). Based upon this age differential adjustmetn fact (2), the reading from Joint Equal Age Chart 399 is reduced by two from JEA=60 to JEA=58, and the present risk value for JEA=58 (xxx) is then used as the bais for rate structuring of this particular combination of insureds.

In this way, it can be seen that an extraordinarily complex problem in the filed of actuarial science has been reduced to a simple solution. Moreover, the solution present is not only to be appreciated for its simplicity, but also in the unique manner in which the integrity of actuarial responsiveness to both the individualized long term care demands and life expectancies of the two insured parties has been maintained.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A computerized system for underwriting a combined, joint life and long term care insurance policy which is actuarially responsive to the long term care expectations and life expectancies of the individuals being insured, said system comprising:

means for generating a set of future risk expectation strings for long term care for an individual insured, categorized by age, sex, and smoking status, and for generating a set of future risk expectation strings for life expectancy for an individual insured, categorized by age, sex, and smoking status;

means for processing said set of future risk expectation strings for long term care and said set of future expectation strings for life expectancy by applying risk exposure sequencing and present risk value analysis to said long term care and life expectancy risk expectation string values for joint equal age to generate joint equal age present risk values;

means for processing said joint equal age present risk values to generate a Joint Equal Age Risk data matrix;

means for categorizing said sets of future risk expectation strings for long term care and for life expectancy into a plurality of Age Differential Classifications;

means for processing each of said Age Differential Classifications (ADC) over a range of possible age differentials (W) between joint insureds, including:

a) means for applying risk exposure sequencing and present risk value analysis to generate temporary joint equal age present risk values (JEA) over a range of possible issue ages (i);

b) for each older issue age (x):

1) means for applying risk exposure sequencing to generate a temporary differential present risk value (ADF[x,x-W]);

2) means for comparing said temporary differential present risk value ADF[x,x-W] with said temporary joint equal age present risk values (JEA), and selecting the crossover point where ADF[x,x-W] <JEA[(i-1)] and ADF[x,x-W]>JEA[i]; and 3) means for storing the crossover point differential (x-i) into a temporary age equivalence matrix;

c) means for analyzing a completed temporary age equivalence matrix for a given ADC and W to select an age differential adjustment factor for said ADC and W, and d) means for storing said selected age differential adjustment factor into an Age Differential Adjustment data matrix; and means for generating Joint Equal Age and Age Differential Adjustment Charts from said Joint Equal Age and Age Differential Adjustment data matrices for use in rate structuring an insurance product covering joint long term care and life benefits.

2. The computerized system for underwriting a combined, joint life and long term care insurance policy which is actuarially responsive to the long term care expectations and life expectancies of the individuals being insured of claim 1 including means for categorizing said risk expectation strings into four Joint Equal Age Risk Classifications, and wherein said Joint Equal Age Risk Classifications are:

a) a first joint equal age classification including two non-smoking females, two females (one smoking), and a male and female (both non-smoking);

b) a second joint equal age classification including a male and female (one smoking), two non-smoking males, and two smoking females;

c) a third joint equal age classification including two males (one smokes), and a male and female (both smoke); and d) a fourth joint equal age classification including two smoking males.

3. The computerized system for underwriting a combined, joint life and long term care insurance policy which is actuarially responsive to the long term care expectations and life expectancies of the individuals being insured of claim 2 wherein:

said Age Differential Classifications are:

a) a first age differential classification including two males;

b) a second age differential classification including a male and female, with the older insured being the male;

c) a third age differential classification including a male and female, with the older insured being the female; and d) a fourth age differential classification including two females.

4. The computerized system for underwriting a combined, joint life and long term care insurance policy which is actuarially responsive to the long term care expectations and life expectancies of the individuals being insured of claim 3 wherein:

said each of said Age Differential Classifications further include subcategories where:
1) both insureds are non-smokers;
2) the older insured is a smoker and the younger insured is a non-smoker;
3) the older insured is a non-smoker and the younger insured is a smoker; and where
4) both insureds are smokers.

5. The computerized system for underwriting a combined, joint life and long term care insurance policy which is actuarially responsive to the long term care expectations and life expectancies of the individuals being insured of claim 1 wherein:
said Age Differential Classifications are:
   a) a first age differential classification including two males;
   b) a second age differential classification including a male and female, with the older insured being the male;
   c) a third age differential classification including a male and female, with the older insured being the female; and
   d) a fourth age differential classification including two females.

6. The computerized system for underwriting a combined, joint life and long term care insurance policy which is actuarially responsive to the long term care expectations and life expectancies of the individuals being insured of claim 5 wherein:
said each of said Age Differential Classifications further include subcategories where:
1) both insureds are non-smokers;
2) the older insured is a smoker and the younger insured is a non-smoker;
3) the older insured is a non-smoker and the younger insured is a smoker; and where
4) both insureds are smokers.

7. A computerized system for underwriting a combined, joint life and long term care insurance policy which is actuarially responsive to the long term care expectations and life expectancies of the individuals being insured, said system comprising:
means for generating a set of future risk expectation strings for long term care for an individual insured, categorized by age, sex, and smoking status, and for generating a set of future risk expectation strings for life expectancy for an individual insured, categorized by age, sex, and smoking status;
means for categorizing possible risk categories into a plurality of Joint Equal Age Risk Classifications;
means for processing said set of future risk expectation strings for long term care into a plurality of blended long term care risk classifications of joint equal age;
means for processing said set of future risk expectation strings for life expectancy into a plurality of blended life expectancy risk classifications of joint equal age;
said blended set of future risk expectation strings for long term care and said blended set of future risk expectation strings for life expectancy for a given Joint Equal Age Risk Classification, in combination, forming a set of blended risk expectation strings for said Joint Equal Age Classification;
for each Joint Equal Age Risk Classification and each issue age, means for applying risk exposure sequencing and present risk value analysis to said blended joint equal age risk expectation strings for said given Joint Equal Age Risk Classification to generate a joint equal age present risk value, and means for storing said joint equal age present risk value for said given Joint Equal Age Risk Classification and issue age into a Joint Equal Age Risk data matrix;
means for categorizing said unblended sets of future risk expectation strings for long term care and for life expectancy into a plurality of Age Differential Classifications, said Age Differential Classifications being distinct and independent from said Joint Equal Age Classifications;
means for processing each of said Age Differential Classifications (ADC) over a range of possible age differentials (W) between joint insureds to select an age differential adjustment factor for each of said ADCs and Ws;
means for storing said selected age differential adjustment factors into an Age Differential Adjustment data matrix; and
means for generating Joint Equal Age and Age Differential Charts from said Joint Equal Age and Age Differential Adjustment data matrices for use in rate structuring an insurance product covering joint long term care and life benefits.

8. The computerized system for underwriting a combined, joint life and long term care insurance policy which is actuarially responsive to the long term care expectations and life expectancies of the individuals being insured of claim 7 wherein:
said Joint Equal Age Risk Classifications are:
   a) a first joint equal age classification including two non-smoking females, two females (one smoking), and a male and female (both non-smoking);
   b) a second joint equal age classification including a male and female (one smoking), two non-smoking males, and two smoking females;
   c) a third joint equal age classification including two males (one smokes), and a male and female (both smoke); and
   d) a fourth joint equal age classification including two smoking males.

9. The computerized system for underwriting a combined, joint life and long term care insurance policy which is actuarially responsive to the long term care expectations and life expectancies of the individuals being insured of claim 8 wherein:
said Age Differential Classifications are:
   a) a first age differential classification including two males;
   b) a second age differential classification including a male and female, with the older insured being the male;
   c) a third age differential classification including a male and female, with the older insured being the female; and
   d) a fourth age differential classification including two females.

10. The computerized system for underwriting a combined, joint life and long term care insurance policy which is actuarially responsive to the long term care expectations and life expectancies of the individuals being insured of claim 9 wherein:
said each of said Age Differential Classifications further include subcategories where:
1) both insureds are non-smokers;
2) the older insured is a smoker and the younger insured is a non-smoker;

3) the older insured is a non-smoker and the younger insured is a smoker; and where
4) both insureds are smokers.

11. The computerized system for underwriting a combined, joint life and long term care insurance policy which is actuarially responsive to the long term care expectations and life expectancies of the individuals being insured of claim 7 wherein:
said Age Differential Classifications are:
a) a first age differential classification including two males;
b) a second age differential classification including a male and female, with the older insured being the male;
c) a third age differential classification including a male and female, with the older insured being the female; and
d) a fourth age differential classification including two females.

12. The computerized system for underwriting a combined, joint life and long term care insurance policy which is actuarially responsive to the long term care expectations and life expectancies of the individuals being insured of claim 11 wherein:
said each of said Age Differential Classifications further include subcategories where:
1) both insureds are non-smokers;
2) the older insured is a smoker and the younger insured is a non-smoker;
3) the older insured is a non-smoker and the younger insured is a smoker; and where
4) both insureds are smokers.

13. A computerized system for underwriting a combined, joint life and long term care insurance policy which is actuarially responsive to the long term care expectations and life expectancies of the individuals being insured, said system comprising:
means for generating a set of future risk expectation strings for long term care for an individual insured, categorized by age, sex, and smoking status, and for generating a set of future risk expectation strings for life expectancy for an individual insured, categorized by age, sex, and smoking status; and
processor means for processing each of said sets of future risk expectation strings for long term care and for life expectancy for an individual insured to generate a Joint Equal Age Risk Chart and an Age Differential Adjustment Chart for use in rate structuring an insurance product covering joint long term care and life benefits, said processor means including:
means for categorizing said set of future risk expectation strings for long term care and said set of future risk expectation strings for life expectancy for an insured into a plurality of Joint Equal Age Risk Classifications;
for each Joint Equal Age Risk Classification and each issue age, means for applying risk exposure sequencing and present risk value analysis to generate a joint equal age present risk value, and inputting said joint equal age present risk value for said given Joint Equal Age Risk Classification and issue age into a Joint Equal Age Risk data matrix;
means for categorizing said sets of future risk expectation strings for long term care and for life expectancy into a plurality of Age Differential Classifications, said Age Differential Classifications being distinct and independent from said Joint Equal Age Classifications;
for each of said Age Differential Classifications (ADC) and for a range of possible age differentials (W) between joint insureds:
a) means for applying risk exposure sequencing and present risk value analysis to generate temporary joint equal age present risk values (JEA) for a range of possible issue ages (i);
b) for each older issue age (x):
1) means for applying risk exposure sequencing to generate a temporary differential present risk value (ADF[x,x−W]);
2) means for comparing said temporary differential present risk value ADF[x,x−W] with said temporary joint equal age present risk values (JEA), and selecting a temporary age equivalence differential; and
3) means for inputting said temporary age equivalence differential into a temporary age equivalence matrix;
c) means for analyzing a completed temporary age equivalence matrix for a given ADC and W to select an age differential adjustment factor for said ADC and W, and
d) means for inputting said selected age differential adjustment factor into an Age Differential Adjustment data matrix; and
means for generating Joint Equal Age and Age Differential Adjustment Charts from said Joint Equal Age and Age Differential Adjustment data matrices for use in rate structuring an insurance product covering joint long term care and life benefits.

14. The computerized system for underwriting a combined, joint life and long term care insurance policy which is actuarially responsive to the long term care expectations and life expectancies of the individuals being insured of claim 13 wherein:
said Joint Equal Age Risk Classifications are:
a) a first joint equal age classification including two non-smoking females, two females (one smoking), and a male and female (both non-smoking);
b) a second joint equal age classification including a male and female (one smoking), two non-smoking males, and two smoking females;
c) a third joint equal age classification including two males (one smokes), and a male and female (both smoke); and
d) a fourth joint equal age classification including two smoking males.

15. The computerized system for underwriting a combined, joint life and long term care insurance policy which is actuarially responsive to the long term care expectations and life expectancies of the individuals being insured of claim 14 wherein:
said Age Differential Classifications are:
a) a first age differential classification including two males;
b) a second age differential classification including a male and female, with the older insured being the male;
c) a third age differential classification including a male and female, with the older insured being the female; and
d) a fourth age differential classification including two females.

16. The computerized system for underwriting a combined, joint life and long term care insurance policy which is actuarially responsive to the long term care expectations and life expectancies of the individuals being insured of claim 15 wherein:

said each of said Age Differential Classifications further include subcategories where:
1) both insureds are non-smokers;
2) the older insured is a smoker and the younger insured is a non-smoker;
3) the older insured is a non-smoker and the younger insured is a smoker; and where
4) both insureds are smokers.

17. The computerized system for underwriting a combined, joint life and long term care insurance policy which is actuarially responsive to the long term care expectations and life expectancies of the individuals being insured of claim 13 wherein:

said Age Differential Classifications are:
a) a first age differential classification including two males;
b) a second age differential classification including a male and female, with the older insured being the male;
c) a third age differential classification including a male and female, with the older insured being the female; and
d) a fourth age differential classification including two females.

18. The computerized system for underwriting a combined, joint life and long term care insurance policy which is actuarially responsive to the long term care expectations and life expectancies of the individuals being insured of claim 17 wherein:

said each of said Age Differential Classifications further include subcategories where:
1) both insureds are non-smokers;
2) the older insured is a smoker and the younger insured is a non-smoker;
3) the older insured is a non-smoker and the younger insured is a smoker; and where
4) both insureds are smokers.

* * * * *